US012630125B2

(12) United States Patent
Kraus

(10) Patent No.: US 12,630,125 B2
(45) Date of Patent: May 19, 2026

(54) TIRE WEDGE SYSTEMS AND RELATED COMPONENTS AND METHODS

(71) Applicant: BonRock LLC, Salt Lake City, UT (US)

(72) Inventor: Bonnie Jeanne Kraus, Salt Lake City, UT (US)

(73) Assignee: BonRock LLC, Salt Lake City, UT (US)

( * ) Notice: Subject to any disclaimer, the term of this patent is extended or adjusted under 35 U.S.C. 154(b) by 343 days.

(21) Appl. No.: 18/338,229

(22) Filed: Jun. 20, 2023

(65) Prior Publication Data

US 2023/0415711 A1 Dec. 28, 2023

Related U.S. Application Data

(60) Provisional application No. 63/366,834, filed on Jun. 22, 2022.

(51) Int. Cl.
*B60T 3/00* (2006.01)

(52) U.S. Cl.
CPC ..................................... *B60T 3/00* (2013.01)

(58) Field of Classification Search
None
See application file for complete search history.

(56) References Cited

U.S. PATENT DOCUMENTS

| | | | | | |
|---|---|---|---|---|---|
| 3,113,642 A | * | 12/1963 | Lay | ......................... | E01F 9/588 |
| | | | | | D12/217 |
| 4,781,271 A | * | 11/1988 | Wokeck | .................... | B60T 3/00 |
| | | | | | 521/54 |

(Continued)

FOREIGN PATENT DOCUMENTS

| | | | | | |
|---|---|---|---|---|---|
| CA | 1067020 A | * | 11/1979 | ................ | B60T 3/00 |
| CN | 111332263 A | * | 6/2020 | ................ | B60T 3/00 |

(Continued)

OTHER PUBLICATIONS

KR-20190008601-A: English Machine Translation (Year: 2019).*

(Continued)

*Primary Examiner* — Melanie Torres Williams
(74) *Attorney, Agent, or Firm* — Law Office of Paul B. Johnson; Paul B. Johnson

(57) ABSTRACT

Tire wedge systems may include a tire contact portion forming a plurality of steps configured to contact a tread portion of a vehicle tire. A compressible portion may be included and may reversibly deform, due to force from the vehicle tire, such that at least one dimension thereof reversibly reduces to a size which is no greater than ninety percent of an original size. The tire contact portion and the compressible portion may be physically distinct components configured to be releasably coupled together, such as through one or more interlocking members. The plurality of steps may at least partially define a curve and may be configured to simultaneously contact the tread portion of the vehicle tire. A ground portion may be included and may be configured to releasably couple with the compressible portion through one or more coupling members formed on one of the ground portion and the compressible portion.

12 Claims, 5 Drawing Sheets

(56) References Cited

U.S. PATENT DOCUMENTS

| | | | | | |
|---|---|---|---|---|---|
| 4,884,664 A | * | 12/1989 | Berg | ........................ | B60T 3/00 |
| | | | | | D12/217 |
| 5,497,857 A | * | 3/1996 | Warren | ..................... | B60T 1/14 |
| | | | | | 188/4 R |
| 2022/0169212 A1 | * | 6/2022 | Nichols | ..................... | B64F 1/16 |

FOREIGN PATENT DOCUMENTS

| | | | | | | |
|---|---|---|---|---|---|---|
| CN | 113548018 A | * | 10/2021 | ................ | B60T 3/00 |
| DE | 102017122577 A1 | * | 3/2019 | ................ | B64F 1/16 |
| KR | 20190008601 A | * | 1/2019 | ............. | B60T 8/245 |
| KR | 20200051227 A | * | 5/2020 | ................ | B60T 3/00 |

OTHER PUBLICATIONS

KR-20200051227-A: English Machine Translation (Year: 2020).*
CN-113548018-A: English Machine Translation (Year: 2021).*
DE-102017122577-A1: English Machine Translation (Year: 2019).*
CN-111332263-A: English Machine Translation (Year: 2020).*

Maxsa 20333 Heavy-Duty Escaper Buddy Traction Mats, offered for sale online in the U.S. at least as early as Nov. 17, 2018, available online (by redirect) at https://tinyurl.com/mrfm649y, downloaded and last visited Jun. 16, 2023.
SECURITYMAN Heavy Duty Wheel Chocks, offered for sale online in the U.S. at least as early as May 20, 2021, available online (by redirect) at https://tinyurl.com/2zhkbpsz, downloaded and last visited Jun. 16, 2023.
Camco 44432 Wheel Chock Without Rope, offered for sale online in the U.S. at least as early as Aug. 9, 2019, available online (by redirect) at https://tinyurl.com/3h3k9x6u, downloaded and last visited Jun. 16, 2023.
AFA Tooling—Set of 4 Heavy Duty Rubber Wheel Chocks w/Ez-Carry Handles, offered for sale online in the U.S. at least as early as May 21, 2022, available online (by redirect) at https://tinyurl.com/bdhfzmm, downloaded and last visited Jun. 16, 2023.
MAXXHAUL 70472 Solid Rubber Heavy Duty Black Wheel Chock 2-Pack, offered for sale online in the U.S. at least as early as Feb. 26, 2022, available online (by redirect) at https://tinyurl.com/2akchndu, downloaded and last visited Jun. 16, 2023.

* cited by examiner

TIRE WEDGE SYSTEMS AND RELATED COMPONENTS AND METHODS

CROSS REFERENCE TO RELATED APPLICATIONS

This document claims the benefit of the filing date of U.S. Provisional Patent Application No. 63/366,834, entitled "Tire Wedge," naming as first inventor Bonnie Jeanne Kraus, which was filed on Jun. 22, 2022, the disclosure of which is hereby incorporated entirely herein by reference.

BACKGROUND

1. Technical Field

Aspects of this document relate generally to systems, devices, and methods for extricating vehicle tires which are stuck in mud, snow, sand, soft earth, and the like. Particular aspects relate to systems, devices, and methods for removing automobile tires which are stuck in mud, snow, sand, soft earth, and the like.

2. Background Art

Vehicular extraction tools are aimed at aiding in the extraction of vehicles stuck in challenging terrains such as snow, mud, soft earth, and the like. These tools have been designed to assist vehicle operators in self-extraction, reducing the need for external assistance (such as from a second vehicle) and minimizing the time spent in such frustrating situations. Traditional tools, such as shovels and traction aiding elements like gravel, sand, cat litter, or even polymer tracks or traction devices have been used to provide a higher friction surface for the vehicle's tires to escape. However, these methods have their limitations, such as (in the case of gravel, sand, or cat litter) the need to carry a significant volume of aggregate in the vehicle, taking up valuable cargo space.

Vehicle extrication mats have also been developed to provide additional friction for the tires, but their effectiveness is limited by their coefficient of friction on the underlying terrain and their flat design, which can often result in the mat being kicked out from under a spinning tire. Furthermore, these mats do not provide any (or much) assistance in lifting the tire out of the substance in which it has become stuck, which may increase the chances of successful extrication.

It is also pointed out that aggregate is not reusable, and so must be replenished/repurchased after each use. Additionally, vehicle extraction mats are prone to shattering or breaking. In light of all of the above limitations, and others, there is a need for an improved tire wedge system that is compact, lightweight, and occupies less cargo space than aggregates. This system should be designed to resist sliding out from under a stuck tire, be economical to manufacture with known materials, and generally conform to the shape of a tire to effectively lift the tire out of its surroundings as an aid to extrication. The development of such a system would represent a significant advancement in the field of vehicular extraction tools and provide a more effective solution for vehicle operators facing challenging terrain.

The tire wedge systems and related components and methods disclosed and discussed herein are designed to overcome the above mentioned shortcomings of existing vehicle extrication tools.

SUMMARY

In some aspects, the techniques described herein relate to a tire wedge system, including: a tire contact portion forming a plurality of steps configured to contact a tread portion of a vehicle tire; and a compressible portion configured to reversibly deform, due to force from the vehicle tire, such that at least one dimension thereof reversibly reduces to a size which is no greater than ninety percent of an original size.

In some aspects, the techniques described herein relate to a tire wedge system, wherein the tire contact portion and the compressible portion are configured to be releasably coupled together.

In some aspects, the techniques described herein relate to a tire wedge system, wherein the tire contact portion includes an angled surface, opposite the plurality of steps, forming an angle relative to a ground surface of between ten degrees and sixty degrees when the tire wedge system is in an in-use position resting on the ground surface.

In some aspects, the techniques described herein relate to a tire wedge system, wherein the tire contact portion includes a first interlocking member, wherein the compressible portion includes a second interlocking member, and wherein the first interlocking member and the second interlocking member are configured to releasably secure the tire contact portion and the compressible portion together.

In some aspects, the techniques described herein relate to a tire wedge system, wherein the first interlocking member includes one of an extension and a cavity, and wherein the second interlocking member includes one of an extension and a cavity.

In some aspects, the techniques described herein relate to a tire wedge system, wherein the plurality of steps are configured to simultaneously contact the tread portion of the vehicle tire. In some cases this involves the tire compressing/conforming some in order to be able to contact all of the steps.

In some aspects, the techniques described herein relate to a tire wedge system, wherein the plurality of steps at least partially define a curve.

In some aspects, the techniques described herein relate to a tire wedge system, wherein the curve substantially matches an outer diameter of the vehicle tire.

In some aspects, the techniques described herein relate to a tire wedge system, wherein the compressible portion includes a substantially triangular cross-section.

In some aspects, the techniques described herein relate to a tire wedge system, further including a ground portion configured to releasably couple with the compressible portion through one or more coupling members formed on one of the ground portion and the compressible portion.

In some aspects, the techniques described herein relate to a tire wedge system, wherein the one or more coupling members includes one of a protrusion and a recess formed on a bottom surface of the compressible portion and one of a protrusion and a recess formed on a top surface of the ground portion.

In some aspects, the techniques described herein relate to a tire wedge system, wherein the one or more coupling members includes a plurality of ridges and grooves configured to allow the compressible portion and the ground portion to releasably couple together at a plurality of positions relative to one another.

In some aspects, the techniques described herein relate to a tire wedge system, wherein the compressible portion includes a top section, a bottom section, and at least one connector connecting the top section with the bottom section, and wherein the at least one connector is configured to reversibly deform to allow the top section and the bottom section to converge toward one another.

In some aspects, the techniques described herein relate to a tire wedge system, wherein the at least one connector at least partially defines a through-hole passing through the compressible portion.

In some aspects, the techniques described herein relate to a tire wedge system, wherein the top section, the bottom section, and the at least one connector are integrally formed from a single piece of material.

In some aspects, the techniques described herein relate to a tire wedge system, including: a tire contact portion including: a plurality of steps configured to simultaneously contact a tread portion of a vehicle tire; a first angled surface opposite the plurality of steps; and a first interlocking member extending from the first angled surface; and a compressible portion including: a top section forming a second angled surface; a second interlocking member extending from the second angled surface and configured to releasably secure to the first interlocking member; a bottom section; and a plurality of connectors connecting the top section with the bottom section; wherein the plurality of connectors at least partially define a plurality of through-holes passing through the compressible portion; and wherein the plurality of connectors are configured to reversibly deform to allow the top section and the bottom section to converge toward one another.

In some aspects, the techniques described herein relate to a tire wedge system, further including a ground portion configured to releasably couple with the compressible portion through a plurality of coupling members formed on a top surface of the ground portion and a bottom surface of the compressible portion, the plurality of coupling members including corresponding ridges and grooves and allowing the compressible portion and the ground portion to releasably couple together at a plurality of positions relative to one another.

In some aspects, the techniques described herein relate to a method of extracting a vehicle tire from a stuck configuration, including: providing a tire wedge system which includes: a tire contact portion having a plurality of steps; and a compressible portion configured to reversibly deform due to force from the vehicle tire; positioning the tire wedge system and the vehicle tire relative to one another such that the plurality of steps simultaneously contact a tread portion of the vehicle tire; rotating the vehicle tire such that it advances along the plurality of steps; and compressing the compressible portion such that at least one dimension thereof reversibly reduces to a size which is no greater than ninety percent of an original size.

In some aspects, the techniques described herein relate to a method, further including releasably coupling the tire contact portion with the compressible portion using a plurality of interlocking members.

In some aspects, the techniques described herein relate to a method, wherein the compressible portion includes a top section, a bottom section, at least one connector connecting the top section with the bottom section, and a through-hole between the top section and the bottom section at least partially defined by the at least one connector, wherein the method further includes reversibly deforming the at least one connector to allow the top section and the bottom section to converge toward one another.

General details of the above-described implementations, and other implementations, are given below in the DESCRIPTION, the DRAWINGS, the CLAIMS and the ABSTRACT.

BRIEF DESCRIPTION OF THE DRAWINGS

Implementations will be discussed hereafter using reference to the included drawings, briefly described below, wherein like designations refer to like elements. The drawings are not necessarily drawn to scale.

DESCRIPTION

Figure 1:
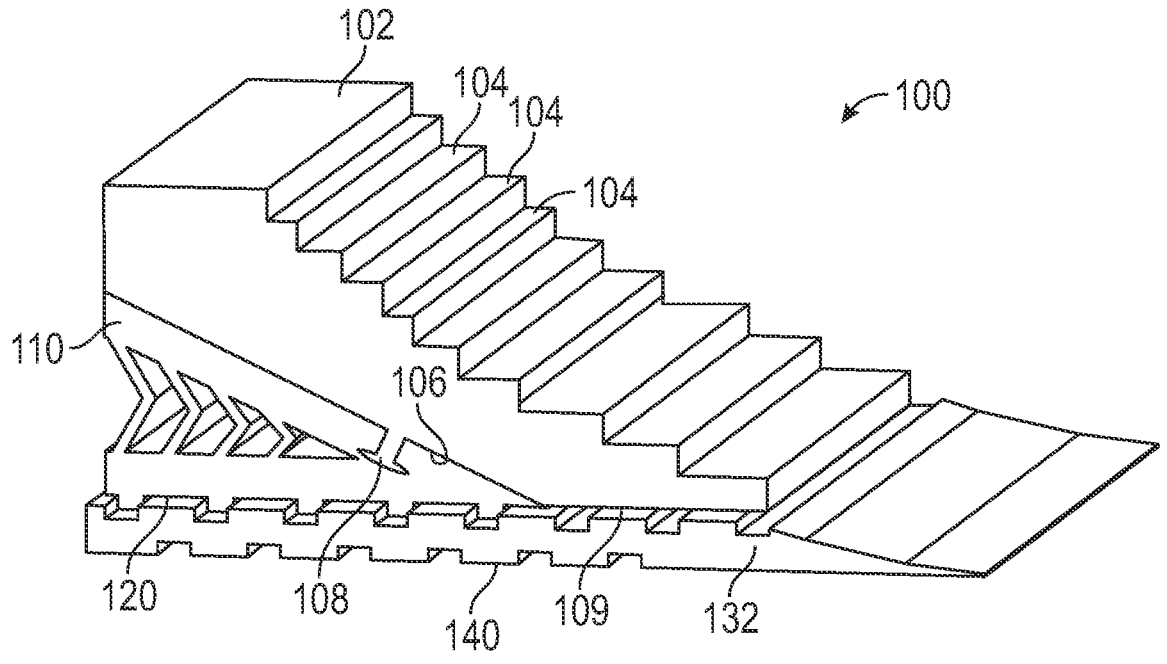
FIG. 1 is a front, top, right side view of an implementation of a tire wedge system.

Implementations/embodiments disclosed herein (including those not expressly discussed in detail) are not limited to the particular components or procedures described herein. Additional or alternative components, assembly procedures, and/or methods of use consistent with the intended tire wedge systems and related components and methods may be utilized in any implementation. This may include any materials, components, sub-components, methods, sub-methods, steps, and so forth.

Referring to FIGS. 1-10, a tire wedge system 100 is disclosed which includes a tire contact portion 102, a compressible portion 110, and a ground portion 132. The tire contact portion 102 has steps 104 to contact a tread portion 150 of a vehicle tire 148. Although in FIG. 10 all of the steps are seen simultaneously contacting the tire, in implementations not all steps might simultaneously contact the tire during extraction (for example, fewer than all steps might simultaneously contact the tire during any given extraction). Nevertheless, the steps are meant to provide multiple contact points for the tire and to aid in the grip or friction between the tire contact portion and the tire, for extraction purposes, and accordingly it may be useful for all steps to simultaneously contact the tread portion of the tire.

Figure 10:
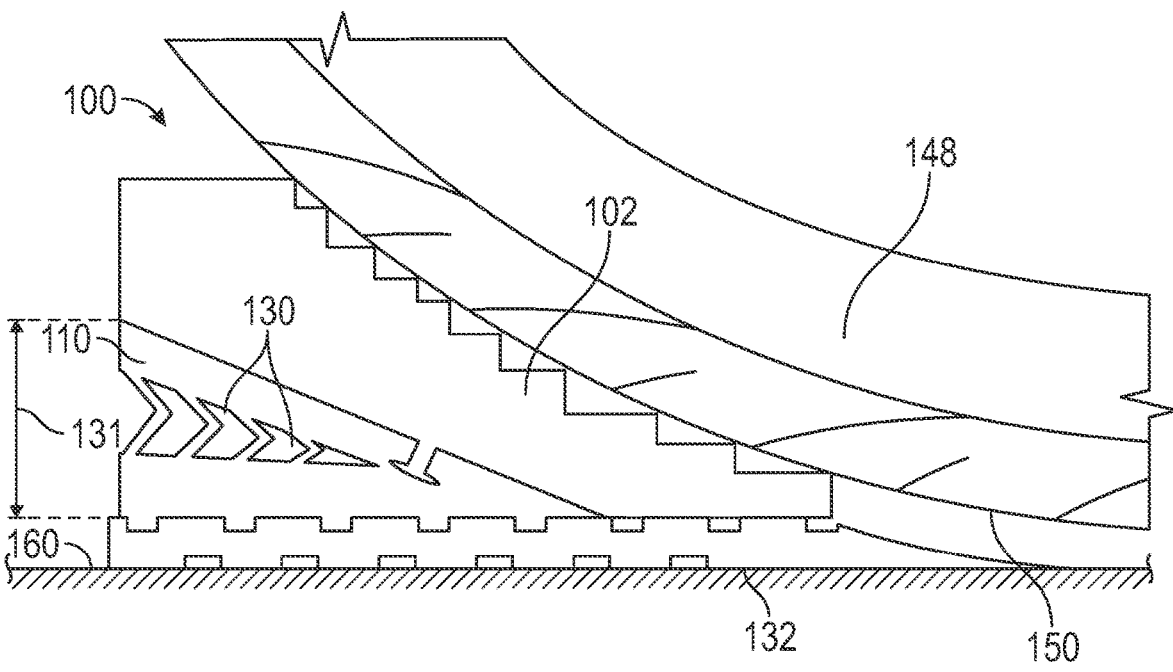
FIG. 10 is a right-side view of the tire wedge system of FIG. 1 in a compressed state lifting/extricating a tire.

Accordingly, in implementations (as can be seen in FIG. 10 where the steps are all contacting the tire) the steps at least partially define a curve. In FIG. 10 the curve is defined by the contact points of the steps touching the tire and matches the curvature of the tire (it is pointed out that, technically, in FIG. 10 there are a few steps not actually touching the tire, but very close to it, but in implementations these may touch the tire or some may not touch the tire, as indicated). The defined curvature could match a circle having any radius, to match differently-sized tires, and in any case various steps may be included which do not all define a single curve and may be useful so that a single tire contact portion tends to match a variety of tire sizes. In any case, in implementations the defined curve substantially matches the outer diameter of the vehicle tire, as in FIG. 10. The phrase "substantially matches," as used here, means that the distance from a tire center to any given step outer corner (which are the intended contact points) does not vary more than ninety-percent to one-hundred ten percent from the actual tire radius.

The tire contact portion 102 includes an angled surface 106 with first interlocking member 108 thereon/therein, and a surface 109 at the bottom front of the tire contact portion. The compressible portion 110 includes a top section 112 having a surface 114 at its top, and a second interlocking member 116 is formed in/on the top section. Surface 114 forms an angle matching angled surface 106, such that the surface 109 ends up being parallel (or substantially parallel, meaning within ninety to one-hundred percent) with a ground surface 160 upon which the tire wedge system rests. The compressible portion further includes a bottom section 118 forming a bottom surface 120, which bottom surface includes a plurality of alternating protrusions 122 and recesses 124. These are useful for mating with and/or engaging alternating recesses 138 and protrusions 136, respectively, of the ground portion 132, which may form a loose fit that only generally prevents backward/forward movement of the compressible portion relative to the ground portion or, in implementations, they may form a friction fit or snap fit such that they also prevent the compressible portion from vertically being separated from the ground portion without added manual force.

Figure 6:
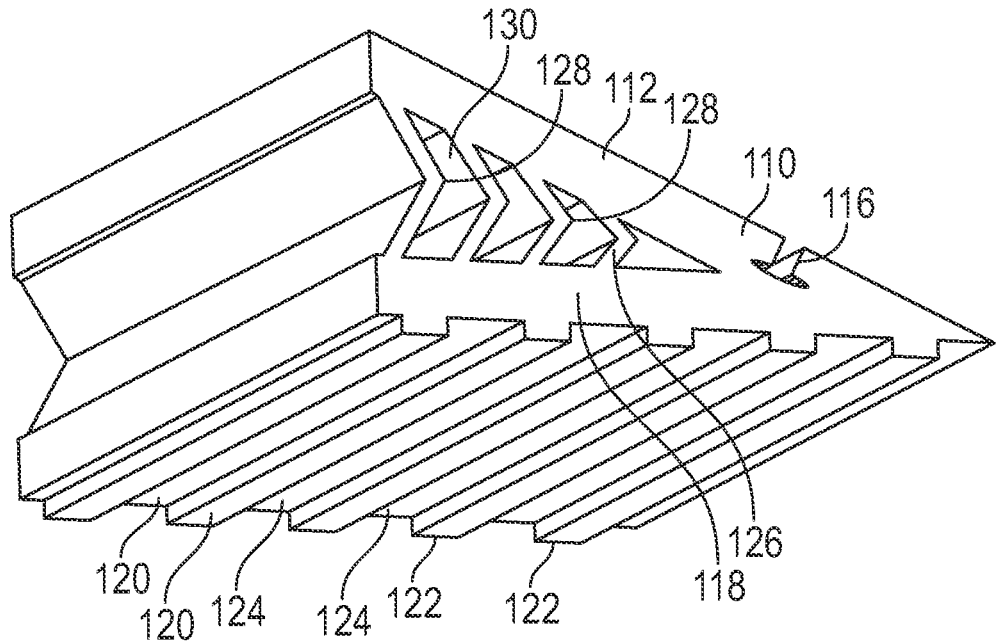
FIG. 6 is a rear, bottom, right side view of the compressible portion of FIG. 5.
Figure 7:
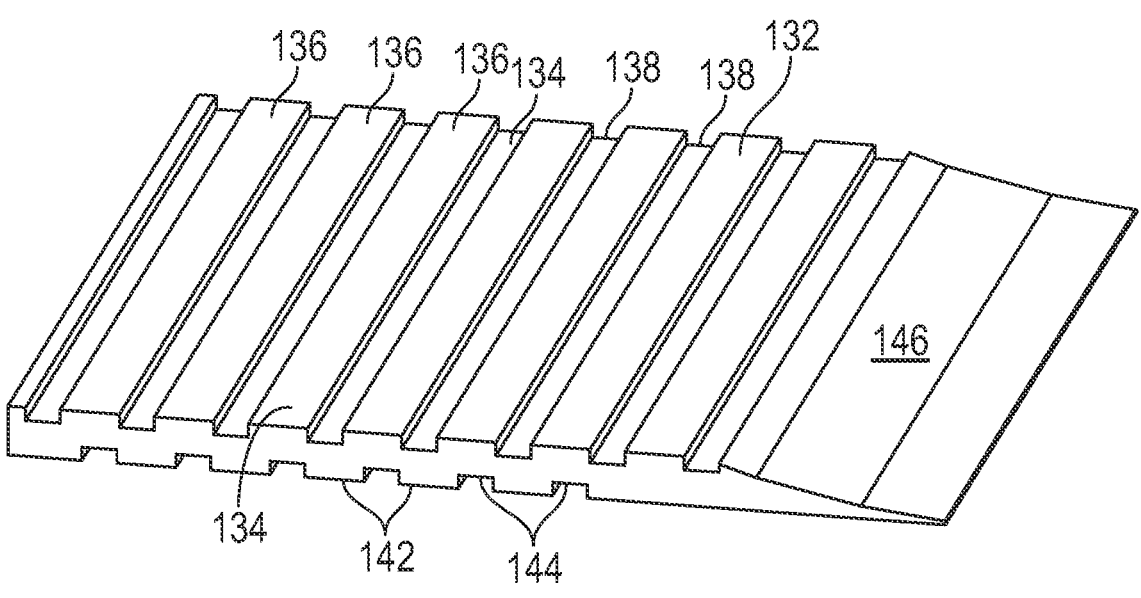
FIG. 7 is a front, top, right side view of an implementation of a ground portion of the tire wedge system of FIG. 1.
Figure 8:
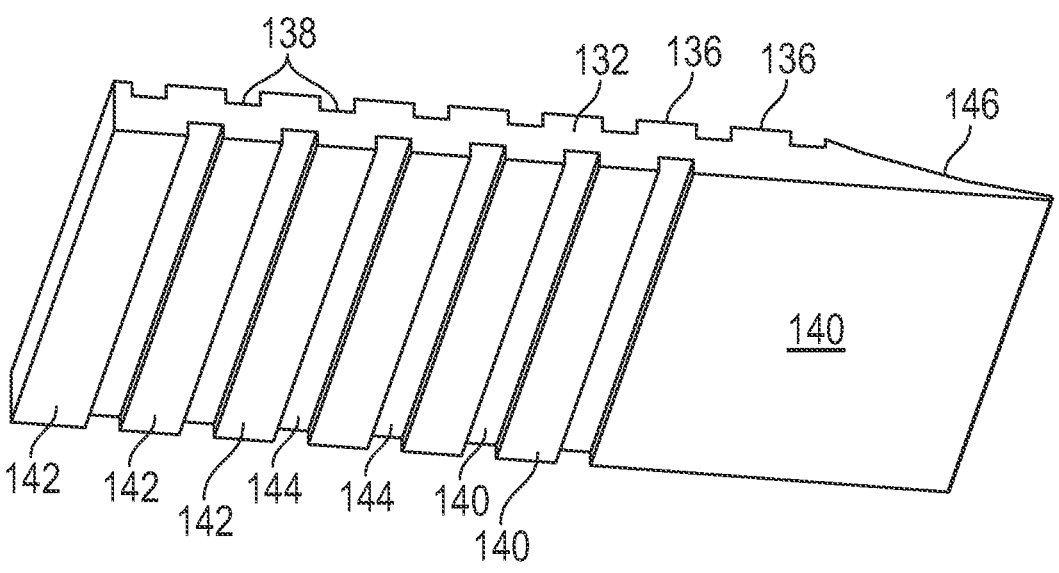
FIG. 8 is a rear, bottom, right side view of the ground portion of FIG. 7.

The respective protrusions and recesses may form straight lines, as in FIGS. 6-7, but they could also form matching curved lines in some cases, such as to provide an angle of rotation of the compressible portion (and tire contact portion) relative to the ground portion, which could be useful when the tire is stuck at a rotated position (such as with the tire in a turn). In such cases, curved recesses/protrusions may help to keep the compressible portion and ground portion mated together but may also allow better contact between the tire contact portion and the tire. In implementations wherein the tire is not stuck at an angle of rotation or turning, or wherein the user can still rotate the tires to a straight/aligned configuration, the compressible portion and tire contact portion may not be rotated laterally at an angle relative to the ground portion.

The first interlocking member 108 and second interlocking member 116 are configured to mate with one another to interlock the tire contact portion and compressible portion. In the example of the drawings the first interlocking member 108 forms a T-shaped (or substantially T-shaped) protrusion or extension and the second interlocking member 116 forms a matching T-shaped (or substantially T-shaped) cavity. In other implementations these could be reversed, such that the first interlocking member 108 is a cavity and the second interlocking member 116 is a matching protrusion or extension. Additionally, more than one of each can be included, and the single one of each is only meant for illustrative purposes.

The ability of the tire contact portion 102 and compressible portion 110 to releasably couple together in this way, such as with a sliding of one relative to the other, allows the two to be slid from right to left and vice versa (out of and into the page, respectively, referring to FIGS. 9-10) for proper positioning relative to a tire, but keeping the two secured together so that they do not move from front to back (away from the tire) or vice-versa relative to one another. The first interlocking member 108 and second interlocking member 116 may form a loose fit or a friction fit, as desired (either of which may be overcome by manual force), and may allow for a variety of combinations of differently-sized and differently-shaped tire contact portions 102 and/or compressible portions 110, such as for different tire sizes. For example, the user could have a single compressible portion 110 but could have differently-sized tire contact portions 102 to match a range of tire sizes (tire contact portions 102 defining smaller radii of curvature could be used for smaller tires, and tire contact portions 102 defining larger radii of curvature could be used for larger tires). In other implementations the interlocking members may be excluded, but they may be useful to keep the tire contact portion and compressible portion secured together during a tire extraction.

The compressible portion includes at least one connector 126 (in the drawings there are four connectors 126), each of which forms a bend 128. Each connector 126 further at least partially defines a through-hole 130. In the drawings, for example, each through-hole is defined by one or two connectors 126, the top section 112, and the bottom section 118. The bends and the through-holes help to allow the compressible portion to compress during an extraction. For example, as seen by comparing FIGS. 9 and 10, a dimension 131 from the top extremity of the compressible portion 110 to a recess 124 of the bottom surface 120 may be reduced by pressure from a tire during an extraction, such that each connector bends to allow the compressible portion to compress. The through-holes help to facilitate such bending, providing room for the connectors to bend. The through-holes could also be used to thread a rope or cord therethrough such as to help pull the tire wedge system 100 towards or away from a tire, in implementations, to further aid in tire extraction and/or in removing/repositioning the tire wedge system 100 relative to the tire. Notwithstanding the above, in implementations the through-holes and/or connectors could all be excluded, and the compressible portion could compress simply due to being formed of a polymer foam material or otherwise formed of a material having a sufficient-enough modulus of elasticity to allow for repeated elastic deformation to accomplish the compressibility.

In implementations the compressible portion compresses, during a tire extraction, such that dimension 131 is reduced to no greater than ninety percent of its original non-compressed size. The compressible portion's compressibility/deformation is reversible, such that when the tire pressure is removed the compressible portion reverts back to its original, non-compressed configuration. In implementations the compressible portion could also or additionally compress due to its being formed of a generally compressible material, such as a foam or other elastic polymer, such that the entire compressible portion undergoes some amount of elastic deformation in addition to or alternative to the compression facilitated by the bends of the connectors.

Angled surface 106 and surface 114 may each form an angle relative to the ground surface 160 of between ten degrees and sixty degrees when the tire wedge system 100 is in an in-use position resting on the ground surface 160. This angle may help prevent the tire contact portion 102 and compressible portion 110 from sliding forward/backward relative to one another (toward and away from the tire, respectively), during an extraction. Other angle ranges are possible, such as between ten and fifty degrees, ten and forty degrees, ten and thirty degrees, and ten and twenty degrees, respectively.

Compressible portion 110 is seen (for example in FIGS. 9-10) to have a substantially triangular cross-section. For example, the surface 114, bottom surface 120, and back surface (not numbered) may, from the angle/view of FIGS. 9-10, define or substantially define one or more triangles. The phrase substantially define, as used here, means that at least thirty percent of the defined triangle(s) would be coextensive with or would contact the surface 114, bottom surface 120, and back surface. This triangular nature helps with the lifting of the tire, during an extraction, and also helps so that the compressible portion compresses more toward its back (the portion away from the tire) than toward its front (the portion towards the tire). This may allow the tire to seat against the tire contact portion 102 and then, as the compressible portion compresses more towards its back, the tire contact portion 102 effectively rotates or pivots some, relative to the ground surface, which may help with extraction. The tire in FIG. 10 is already seen lifted higher than in FIG. 9, but this rotation or pivoting of the tire contact portion 102 may lift the tire further (and move it further towards the back of the tire wedge system 100) for further extraction functionality.

In the drawings the tire contact portion 102 is seen as being flush with the compressible portion 110 at the angled surface 106, but in implementations there may be an intentional gap between angled surface 106 and surface 114, which may facilitate even further pivoting of the tire contact portion 102. Such a gap would allow for some pivoting in both directions (clockwise and counter-clockwise) so that, for example, the top of the tire contact portion could pivot upward when first contacting a tire (closing the gap between the two portions proximate the sharp or very thin/pointed front end of the compressible portion and widening the gap at the backs of these portions) and could pivot downward once the tire pressure is applied (closing the gap between the two portions proximate their backs and widening the gap between the two portions proximate the sharp or very thin/pointed front end of the compressible portion). The tire gap may be removed/eliminated due to the general compressibility of the compressible portion, in some cases, when tire pressure is applied. This pivoting allows the steps or friction points to meet and be pressed against the tire earlier, and stay in contact therewith throughout the extraction process, to help with extraction.

Figure 9:
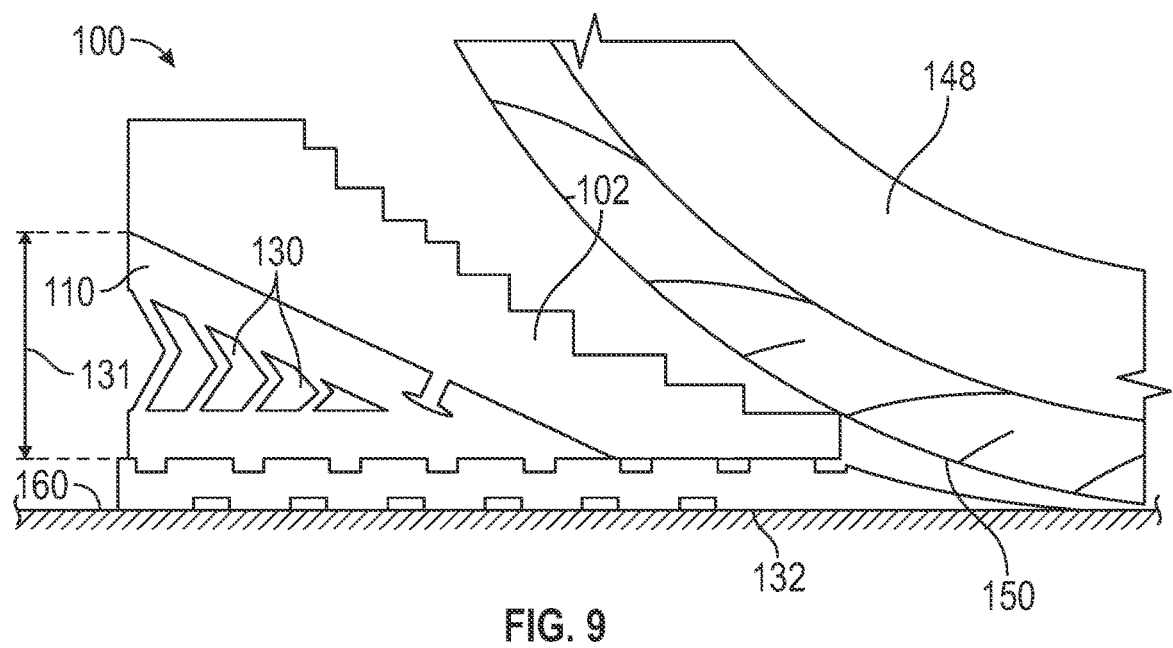
FIG. 9 is a right side view of the tire wedge system of FIG. 1 in a non-compressed state about to lift/extricate a tire.

As seen in the drawings, in some cases the top section, bottom section, and connectors of the compressible portion are integrally formed from a single piece of material. Other options are possible, however, and they could be separate components pieced/joined together fixedly or releasably. In implementations the connectors could be formed of springs, such as coil or leaf springs, to provide compressibility but also to revert the compressible portion back to a non-compressed state after an extraction. As can be seen in FIGS. 9-10, during compression of the compressible portion the top section and bottom section converge toward (or are brought toward) one another.

The drawings show a ground portion 132. The ground portion is optional, and may be excluded in some implementations, but it may be used in some cases to help with extraction. The ground portion includes a top surface 134 having the above-mentioned alternating protrusions and recesses. These are coupling members, similar to the protrusions and recesses of the compressible portion, to allow the compressible portion and ground portion to couple together. The ground portion includes a surface 140 at its bottom also forming alternating protrusions 142 and recesses 144. The protrusions 142 and recesses 144 may help with grip or friction of the ground portion relative to the ground surface, or for mating with another member (such as another ground portion or some other element, for adding extraction features/benefit), and in some cases may be excluded. When they are included, they could form straight lines, or curves, or a zig-zag or other pattern (indeed, the other protrusions/recesses described herein could similarly form a zig-zag or other pattern to prevent movement of the respective components relative to one another, along multiple directions, during an extraction).

In implementations the protrusions 122 and recesses 124, and/or the protrusions 136 and recesses 138, could be excluded, though they may help with securing the compressible portion and ground portion together and/or to prevent movement of the two relative to one another, in at least one direction, during an extraction. In some cases the compressible portion and ground portion have sufficient friction relative to one another that, even without the respective protrusions and recesses, they are prevented or substantially prevented from sliding relative to one another in at least one direction during an extraction.

The respective protrusions may form linear, straight ridges and the respective recesses may form linear, straight grooves (though, as discussed, they could be curved) to allow the compressible portion and ground portion to releasably couple together at a plurality of positions relative to one another. For example, referring to FIG. 1, the compressible portion and tire contact portion could be slid into the page at an angle or out of the page at an angle to adjust the position of these two relative to the ground portion, and/or (referring to FIG. 9) the compressible portion could be advanced toward the tire or away from it, with the ground portion remaining stationary, by lifting the compressible portion and coupling its protrusions/recesses with different recesses/protrusions of the ground portion, as desired. The tire contact portion could also be slid into the page at an angle or out of the page at an angle, relative to the compressible portion, and remain coupled thereto due to the interlocking members. In these ways, the respective portions of the tire wedge system may be moved and/or adjusted as needed for any given extraction. For example, in some cases a tire may benefit from being lifted upward more at the outward-facing side of the tire than the inward-facing side (or vice versa), and in such cases the compressible portion and/or tire contact portion can be slid more towards the side that needs more lifting, while the ground portion remains stationary.

The ground portion further includes a curved surface 146 which is useful for helping to guide the tire upward and onto the tire wedge system 100. This surface may, alternatively, be angled with a straight angle instead of curved, though when it is curved it may provide more grip for the tire due to a greater contact area of the surface with the tire.

Referring to FIGS. 9-10, during an extraction process the vehicle tire is rotated such that it advances along the plurality of increasingly-higher steps and is lifted upward out of an extricated position and horizontally away from the extricated position.

Accordingly, as described above, the tire wedge system 100 aids in lifting and extracting a stuck tire from snow, mud, soft ground, slippery ground/rocks, or other difficult terrains, offering a compact, lightweight, and efficient alternative to traditional vehicle extrication tools. The tire contact portion and/or other components of the tire wedge system are formed of materials that form a high friction with the tire even when wet, so as to aid in extraction.

The steps, instead of defining a curve, could define a linear angle or a spiral shape (i.e., a curve formed by an adjusting radius), as desired, to help with any given extraction process, to optimize the contact with the tire tread and maximize the frictional force. Additionally, the steps can be coated with a high-friction material or have a textured surface to further improve the grip between the tire and the tire contact portion.

As indicated, the compressible portion helps adapt the tire wedge system to the shape of the tire during the initial placement and throughout the extraction process. This adaptability is achieved by using materials such as pressure-responsive polymers, sponges, or other structures that comply/deform with pressure, which allows the compressible portion to deform and conform the tire wedge system to the tire's shape under the applied force. The compressible portion can be designed with varying levels of compressibility, depending on the specific application and the type of terrain it will be used on. For instance, a more compressible material may be used for softer terrains, while a less compressible material may be more suitable for harder terrains.

The tire wedge system's ability to conform to the tire shape not only ensures a secure and stable contact between the tire and the tire contact portion but also helps lift the tire out of the entrapping area more effectively. This is achieved in part by distributing the force exerted by the tire more evenly across the tire contact portion, reducing the chances of the tire slipping or sinking further into the entrapping material. Furthermore, the compressible portion can be designed to have a variable thickness (as with the triangle shape of the drawings), allowing it to provide additional support and lift to the tire as it rolls over the tire wedge system. This feature can be particularly beneficial in situations where the tire is deeply embedded in the entrapping material, as it helps to gradually lift the tire out of the entrapping area, improving the chances of successful extrication.

The tire wedge system can also be designed with additional features to further enhance its performance and adaptability. For example, the tire contact portion and the compressible portion can be configured to be releasably coupled together, allowing for easy assembly, disassembly, and customization of the tire wedge system based on the specific needs of the user. Moreover, the tire wedge system can be designed with an adjustable angle between the tire contact portion and the ground surface (such as by swapping out a tire contact portion and/or compressible portion for those which would result in different angles relative to the ground surface), enabling the user to optimize the system's performance based on the specific terrain and extraction conditions. In some embodiments the tire contact portion, the compressible portion, and the ground portion are configured to be releasably coupled together, such as for this swapping out feature.

Additionally, the releasable coupling between the tire contact portion and the compressible portion allows for easy assembly and disassembly of the tire wedge system, making it more convenient for storage and transportation. The tire contact portion can be made of various materials, such as polymer, wood, metal, or composites, while the compressible portion can be made of another polymer structure or other suitable materials.

In some embodiments the tire contact portion comprises an angled surface, opposite the plurality of steps, forming an angle relative to a ground surface of between ten degrees and sixty degrees when the tire wedge system is in an in-use position resting on the ground surface.

The tire wedge system may be easily positioned under a tire and may facilitate the tire's traversal up the tire wedge system during the extraction process. The angle range of ten to sixty degrees ensures that the tire wedge system can be effectively used in various terrains and conditions, providing optimal support and lift for the tire during extrication.

The first interlocking member and the second interlocking member may allow for easy assembly and disassembly of the tire wedge system.

In some embodiments the plurality of steps are configured to simultaneously contact the tread portion of the vehicle tire. Advantageously, the simultaneous contact of the plurality of steps with the tread portion of the vehicle tire increases the friction between the tire and the tire contact portion, further improving the tire's grip on the tire wedge system and enhancing the lifting and extraction process. In some embodiments the curve defined by the steps substantially matches an outer diameter of the vehicle tire. Matching the curve of the tire wedge system to the outer diameter of the vehicle tire further enhances the conformity of the tire wedge system to the tire shape, providing optimal support and lift during the extraction process.

Figure 2:
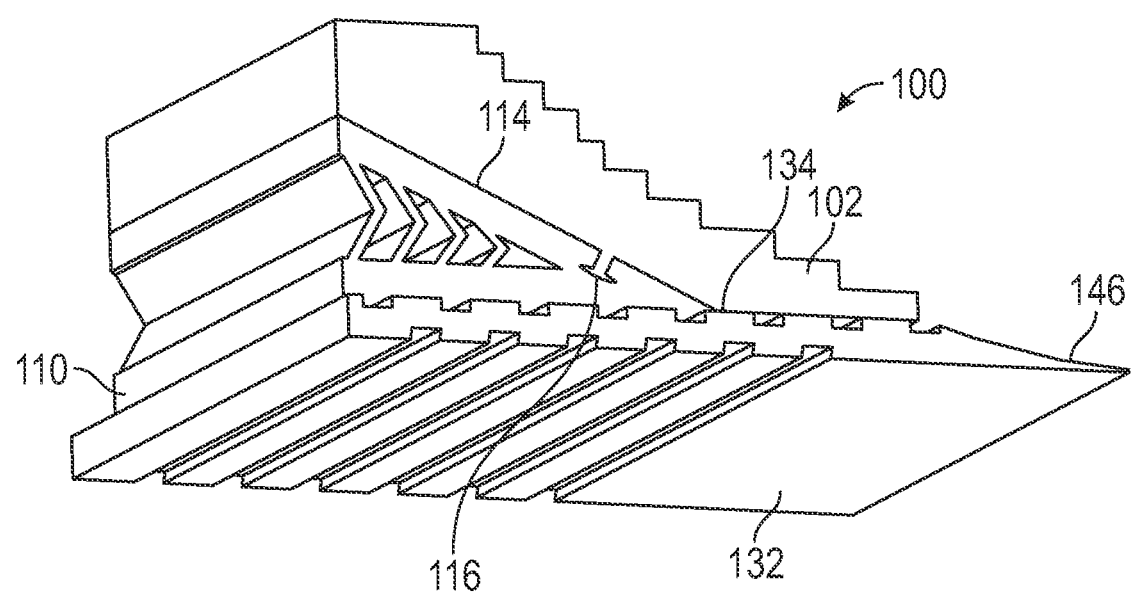
FIG. 2 is a rear, bottom, right side view of the tire wedge system of FIG. 1.
Figure 3:
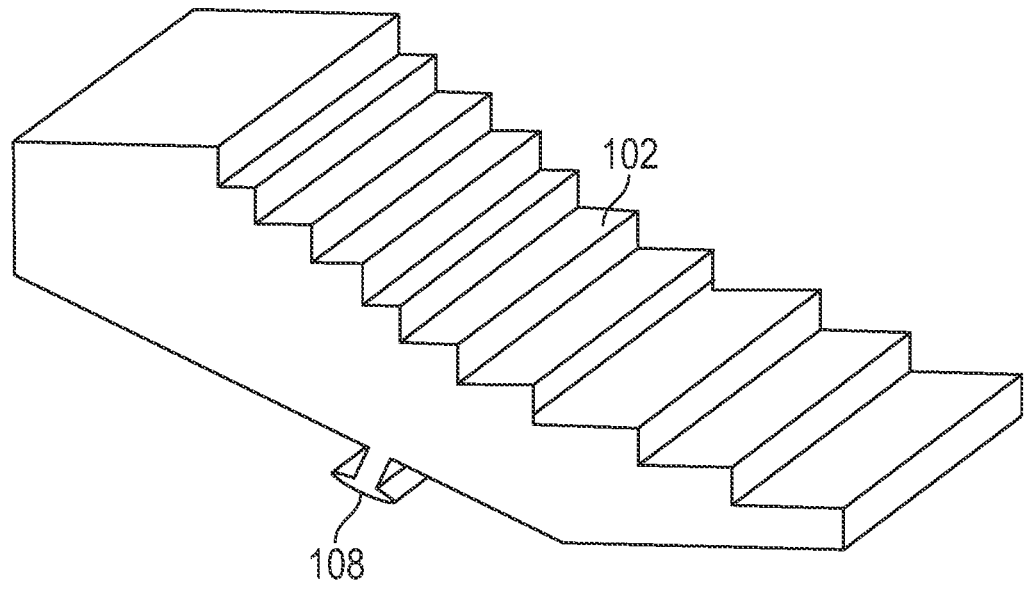
FIG. 3 is a front, top, right side view of an implementation of a tire contact portion of the tire wedge system of FIG. 1.
Figure 4:
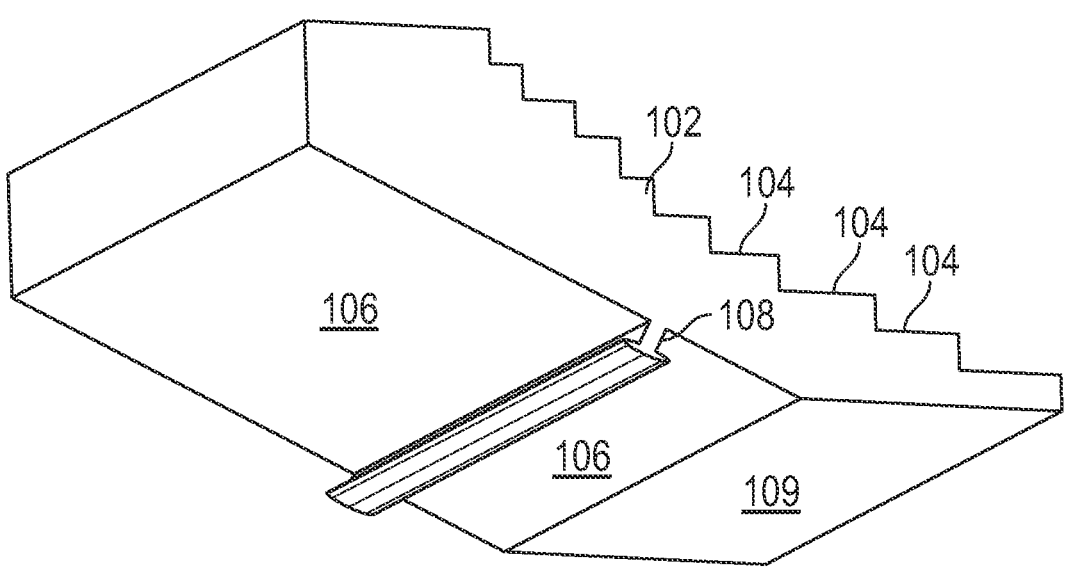
FIG. 4 is a rear, bottom, right side view of the tire contact portion of FIG. 3.
Figure 5:
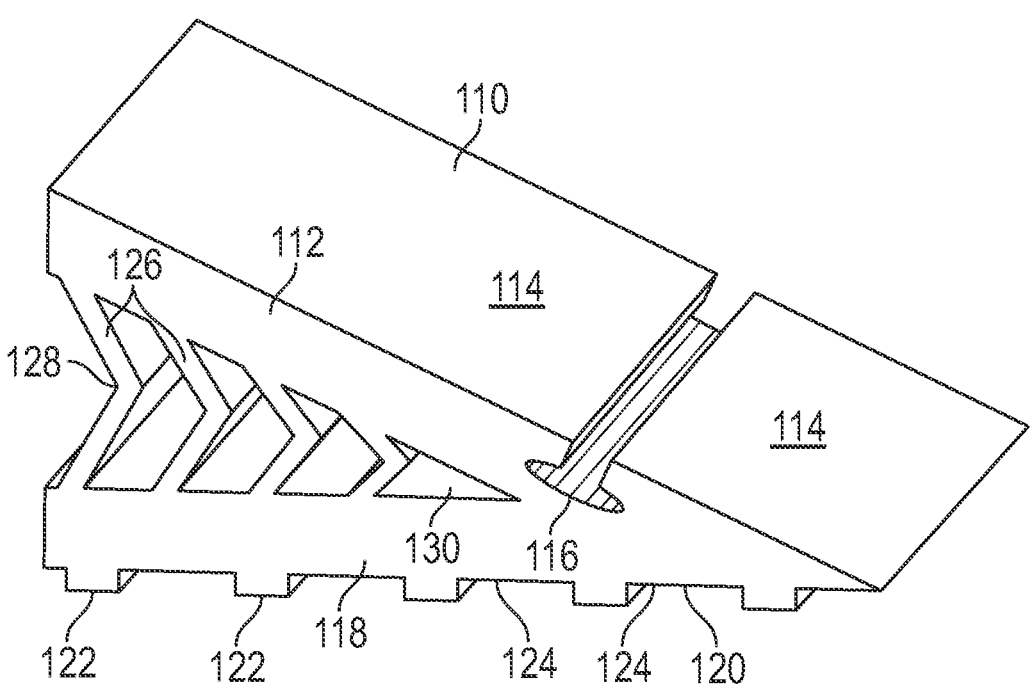
FIG. 5 is a front, top, right side view of an implementation of a compressible portion of the tire wedge system of FIG. 1.

When used, the ground portion provides additional support and stability to the tire wedge system by distributing the weight of the vehicle across a larger area (see, for example, FIGS. 1-2 wherein the ground portion is longer and wider than the other portions of the tire wedge system). This can be particularly useful in environments where the underlying structure of the ground, such as snow or soft earth, is not firm. The releasable coupling between the ground portion and the compressible portion allows for easy assembly and disassembly of the tire wedge system, making it more convenient for storage and transportation. The ground portion can be made of various materials, such as polymer, wood, metal, or composites, and may be designed to provide a firmer substrate on which to position the compressible portion and tire contact portion.

While the use of protrusions and recesses as coupling members provides a secure and stable connection between the compressible portion and the ground portion, it also allows for easy assembly and disassembly of the tire wedge system, further enhancing its convenience for storage and transportation.

The ridges and grooves discussed above allow for greater flexibility in positioning the compressible portion and the ground portion relative to each other, enabling the tire wedge system to be adapted to various terrains and conditions.

While the connectors allow for compression of the compressible portion, they also provide additional structural support and stability to the tire wedge system, ensuring that it can effectively withstand the force exerted by the vehicle tire during the extraction process and not compress more than is desired. The chosen material of the compressible portion also helps with this.

In addition to other advantages, the through-holes also reduce the overall weight of the tire wedge system, making it easier to handle, transport, and store.

When the compressible portion is formed of a single piece of material, such as a polymer, wood, metal, or composite, this helps to ensure a durable and robust construction.

It will be understood that the phrase reversibly deform as used herein may refer to the ability of a material or object, such as the compressible portion of the tire wedge system, to undergo a temporary change in shape or size under applied force, and then return to its original shape or size once the force is removed.

It will be understood that the term compressing as used herein may refer to the process of applying force to a material or object, causing it to reduce in size or volume, and potentially allowing it to return to its original shape once the force is removed, as exemplified in the compressible portion of the tire wedge system.

It will be understood that the term deforming as used herein may refer to the process of altering the shape or size of an object, such as the compressible portion of the tire wedge system, through the application of external force, like the force exerted by a vehicle tire.

It will be understood that the term converge as used herein may refer to the process of the compressible portion of the tire wedge system decreasing in size and its top section and bottom section coming or drawing closer together under the force exerted by the vehicle tire, ultimately reducing its size until the pressure is removed and it then returns to its original state.

It will be understood that the term steps as used herein may refer to the raised features or protrusions on the tire contact portion which provide grip and support to the vehicle tire when engaged therewith.

It will be appreciated by the person of skill in the art that various modifications may be made to the above-described examples without departing from the scope of the invention as defined by the appended claims.

In implementations, due to the selected/designed characteristics of the compressible portion, the dimension 131 may deform to 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, or 10%, of its original size. In implementations it may deform within any given range therein, such as between 10%-90%, 20%-90%, 30%-90%, 40%-90%, 50%-90%, 60%-90%, 70%-90%, and 80%-90% of its original size.

In implementations the angled surface 106 (and the corresponding mating angle of surface 114) forms an angle relative to the ground surface, during a resting and non-compressed state, of 60 degrees, 59 degrees, 58 degrees, 57 degrees, 56 degrees, 55 degrees, 54 degrees, 53 degrees, 52 degrees, 51 degrees, 50 degrees, 49 degrees, 48 degrees, 47 degrees, 46 degrees, 45 degrees, 44 degrees, 43 degrees, 42 degrees, 41 degrees, 40 degrees, 39 degrees, 38 degrees, 37 degrees, 36 degrees, 35 degrees, 34 degrees, 33 degrees, 32 degrees, 31 degrees, 30 degrees, 29 degrees, 28 degrees, 27 degrees, 26 degrees, 25 degrees, 24 degrees, 23 degrees, 22 degrees, 21 degrees, 20 degrees, 19 degrees, 18 degrees, 17 degrees, 16 degrees, 15 degrees, 14 degrees, 13 degrees, 12 degrees, 11 degrees, or 10 degrees. In implementations the angle reduces, in a compressed state, to any of the above angles below 60 degrees and/or to 9 degrees, 8 degrees, 7 degrees, 6 degrees, or 5 degrees.

It is pointed out herein that the interlocking members extend from their relative surfaces whether they extend outward away from the rest of the relative component or into the component—in either case extending away from the relative surfaces. For example first interlocking member 108 extends away from angled surface 106 by extending away from the rest of tire contact portion 102, but second interlocking member 116 extends away from surface 114 by extending into the compressible portion 110 itself.

In implementations the tire contact portion 102 is rigid. In implementations the compressible portion 110 is made compressible by voids/holes, or by being a foam, or using springs, or by other methods. The ground portion may be optional and may be more useful when a tire is very stuck, or in a deep hole. The ground portion may bend and conform some to the tire itself, and may also contact the tire. In implementations, instead of interlocking members, any other mechanism may be used to releasably secure the tire contact portion 102 and compressible portion 110 together, such as a light adhesive that can be manually overcome and re-stuck, hook-and-loop fasteners, screws or bolts, As seen in the drawings, the ground portion may have a sharp or very thin/pointed end proximate curved surface 146, that will be placed under a portion of the stuck tire. The curvature of curved surface 146 may match (or through compressibility conform to) the shape of the tire, and its thinness allows it to be slipped/inserted to or proximate the undermost part of the tire. The protrusions 142 may provide friction points along the ground, helping the tool to keep traction in snow, sand, ice, mud, etc., and not slip while the tire is rolling over it.

The compressible portion may be malleable and resilient. It may serve as a spring of sorts, helping to push the tire contact portion 102 and its friction points fully against the stuck tire. The firmness of the compressible portion may ensure the steps are pressed against the stuck tire, helping provide friction and gripping during extraction. The compressible portion is malleable and resilient enough to allow it to collapse as the tire is rolling over it. In implementations the compressible portion may balance elasticity (or springiness), so that it can be repeatedly rolled over and revert to its original shape, and resilience to provide pressure of the steps against the tire. Accordingly, the compressible/elastic properties of the compressible portion (such as size/shape/number of connectors and the elastic modulus of the material of the compressible portion) may be selected to be in a range that allows such elasticity and resilience. The compressible portion absorbs some of the impact of the weight of the vehicle, preventing damage/deformation (or substantial deformation) of the other portions of the tire wedge system 100 so that the system can be used over and over (and so that no portion of the system is crushed, shattered, or otherwise irreparably damaged by a heavy vehicle).

The tire contact portion 102 has friction points at the outer corners of the steps that are in a pattern which may conform to the curvature of a car tire. These provide numerous friction points for the stuck tire to grab onto. Once the tire has friction with these points it can roll over the steps as the compressible portion collapses/compresses, raising and extracting the tire and freeing the vehicle.

It is noted that in some cases two or more of any of the components could be integrally formed together instead of being separate pieces. For example, the tire contact portion and the compressible portion could in some cases be integrally formed from a single piece of material, and the same goes for the compressible portion and the ground portion, and/or for all three portions. Additionally, any of the portions could be used individually in an extraction process—for example using only the tire contact portion, or only the compressible portion, or only the ground portion—for extracting a tire, in cases where the use of only one of those portions works for extraction.

It is further pointed out that the ground portion (or any other portion) could be used to shovel out snow or dirt or any other matter that the tire is stuck in, in cases where that is useful to help with placement of the tire wedge system or is otherwise useful for extraction.

It is further pointed out that in implementations of an extraction the tire itself conforms/compresses near or at the contact points of the steps, increasing the surface area of contact and friction between the tire and the tire contact portion, for improved grip or "grab" and for improved extraction. In some cases this is due to the rigidity of the tire contact portion. In some cases the tire contact portion is more rigid and/or has a greater elastic modulus (Young's modulus) than the compressible portion for this purpose. In some cases the elastic modulus of the tire contact portion is at least twice that of the compressible portion, or ten times that of the compressible portion, or one hundred times that of the compressible portion.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of tire wedge systems and related components and methods, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element. Furthermore, in some cases a claim may recite a "second" or "third" or "fourth" (or so on) of an element, and this does not necessarily imply that the claim requires a first (or so on) of that element—if the claim does not explicitly recite a "first" (or so on) of that element (or an element with the same name, such as "a widget" and "a second widget"), then the claim does not require a "first" (or so on) of that element.

Method steps disclosed anywhere herein, including in the claims, may be performed in any feasible/possible order. Recitation of method steps in any given order in the claims or elsewhere does not imply that the steps must be performed in that order—such claims and descriptions are intended to cover the steps performed in any order except any orders which are technically impossible or not feasible. However, in some implementations method steps may be performed in the order(s) in which the steps are presented herein, including any order(s) presented in the claims.

What is claimed is:

1. A tire wedge system, comprising:
a tire contact portion forming a plurality of steps configured to contact a tread portion of a vehicle tire; and
a compressible portion configured to reversibly deform, due to force from the vehicle tire, such that at least one dimension thereof reversibly reduces to a size which is no greater than ninety percent of an original size;
wherein the tire contact portion and the compressible portion are configured to be releasably coupled together; and
wherein the tire contact portion comprises a first interlocking member, wherein the compressible portion comprises a second interlocking member, and wherein the first interlocking member and the second interlocking member are configured to releasably secure the tire contact portion and the compressible portion together.

2. The tire wedge system of claim 1, wherein the first interlocking member comprises one of an extension and a cavity, and wherein the second interlocking member comprises one of an extension and a cavity.

3. A tire wedge system, comprising:
a tire contact portion forming a plurality of steps configured to contact a tread portion of a vehicle tire;
a compressible portion configured to reversibly deform, due to force from the vehicle tire, such that at least one dimension thereof reversibly reduces to a size which is no greater than ninety percent of an original size; and
a ground portion configured to releasably couple with the compressible portion through one or more coupling members formed on one of the ground portion and the compressible portion;
wherein the one or more coupling members comprises one of a protrusion and a recess formed on a bottom surface of the compressible portion and one of a protrusion and a recess formed on a top surface of the ground portion.

4. A tire wedge system, comprising:
a tire contact portion forming a plurality of steps configured to contact a tread portion of a vehicle tire;
a compressible portion configured to reversibly deform, due to force from the vehicle tire, such that at least one dimension thereof reversibly reduces to a size which is no greater than ninety percent of an original size; and
a ground portion configured to releasably couple with the compressible portion through one or more coupling members formed on one of the ground portion and the compressible portion;
wherein the one or more coupling members comprises a plurality of ridges and grooves configured to allow the compressible portion and the ground portion to releasably couple together at a plurality of positions relative to one another.

5. A tire wedge system, comprising:
a tire contact portion forming a plurality of steps configured to contact a tread portion of a vehicle tire; and
a compressible portion configured to reversibly deform, due to force from the vehicle tire, such that at least one dimension thereof reversibly reduces to a size which is no greater than ninety percent of an original size;
wherein the compressible portion comprises a top section, a bottom section, and at least one connector connecting the top section with the bottom section, and wherein the at least one connector is configured to reversibly deform to allow the top section and the bottom section to converge toward one another.

6. The tire wedge system of claim 5, wherein the at least one connector at least partially defines a through-hole passing through the compressible portion.

7. The tire wedge system of claim 5, wherein the top section, the bottom section, and the at least one connector are integrally formed from a single piece of material.

8. A tire wedge system, comprising:
a tire contact portion comprising:
    a plurality of steps configured to simultaneously contact a tread portion of a vehicle tire;
    a first angled surface opposite the plurality of steps; and
    a first interlocking member extending from the first angled surface; and
a compressible portion comprising:
    a top section forming a second angled surface;
    a second interlocking member extending from the second angled surface and configured to releasably secure to the first interlocking member;
    a bottom section; and
    a plurality of connectors connecting the top section with the bottom section;
    wherein the plurality of connectors at least partially define a plurality of through-holes passing through the compressible portion; and
    wherein the plurality of connectors are configured to reversibly deform to allow the top section and the bottom section to converge toward one another.

9. The tire wedge system of claim 8, further comprising a ground portion configured to releasably couple with the compressible portion through a plurality of coupling members formed on a top surface of the ground portion and a bottom surface of the compressible portion, the plurality of coupling members comprising corresponding ridges and grooves and allowing the compressible portion and the ground portion to releasably couple together at a plurality of positions relative to one another.

10. A method of extracting a vehicle tire from a stuck configuration, comprising:
providing a tire wedge system which includes:
    a tire contact portion having a plurality of steps; and
    a compressible portion configured to reversibly deform due to force from the vehicle tire;
positioning the tire wedge system and the vehicle tire relative to one another such that the plurality of steps simultaneously contact a tread portion of the vehicle tire;
rotating the vehicle tire such that it advances along the plurality of steps; and
compressing the compressible portion such that at least one dimension thereof reversibly reduces to a size which is no greater than ninety percent of an original size.

11. The method of claim 10, further comprising releasably coupling the tire contact portion with the compressible portion using a plurality of interlocking members.

12. The method of claim 10, wherein the compressible portion comprises a top section, a bottom section, at least one connector connecting the top section with the bottom section, and a through-hole between the top section and the bottom section at least partially defined by the at least one connector, wherein the method further comprises reversibly deforming the at least one connector to allow the top section and the bottom section to converge toward one another.

\* \* \* \* \*